United States Patent
Choi et al.

(10) Patent No.: US 7,321,582 B2
(45) Date of Patent: Jan. 22, 2008

(54) METHOD FOR DYNAMIC CONTROL OF RTS THRESHOLD TO IMPROVE THROUGHPUT OF MAC IN WIRELESS LAN SYSTEM, AND COMPUTER-READABLE MEDIUM THEREOF

(75) Inventors: Woo-Yong Choi, Daejeon (KR); Sok-Kyu Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 696 days.

(21) Appl. No.: 10/897,160

(22) Filed: Jul. 21, 2004

(65) Prior Publication Data

US 2005/0141476 A1 Jun. 30, 2005

(30) Foreign Application Priority Data

Dec. 27, 2003 (KR) ............ 10-2003-0098202

(51) Int. Cl.
H04B 7/212 (2006.01)
(52) U.S. Cl. ............ 370/348; 370/321; 370/329; 370/332; 370/347; 370/395.53; 455/452.2; 455/453; 455/464; 455/502; 455/501
(58) Field of Classification Search ............ 370/348, 370/321, 329, 332, 347, 395.53, 333, 341; 455/452.2, 453, 502, 501
See application file for complete search history.

(56) References Cited

U.S. PATENT DOCUMENTS

2002/0037000 A1* 3/2002 Park et al. ............ 370/349

2004/0028000 A1* 2/2004 Billhartz ............ 370/312
2004/0114562 A1* 6/2004 Kim ............ 370/338
2005/0002373 A1* 1/2005 Watanabe et al. ............ 370/346

FOREIGN PATENT DOCUMENTS

KR 1020020039188 A 5/2002

OTHER PUBLICATIONS

Giuseppe Bianchi , Performance Analysis of the IEEE 802.11 Distributed Coordination Function (IEEE journal on selected areas in communications, vol. 18, No. 3, Mar. 2000).*
Giuseppe Bianchi, IEEE 802.11-Saturation Throughput Analysis (IEEE communications Letters, vol. 2, No. 12, Dec. 1998).*
IEEE Communications Letters, vol. 2 No. 12, Dec. 1998, pp. 318.
IEEE P802.11, Wireless LANs, Minutes of High Throughput Study Group Meetings, Jul. 21, 22, 24, 2003, 24 pages.

* cited by examiner

Primary Examiner—Rafael Perez-Gutierrez
Assistant Examiner—Khai Nguyen
(74) Attorney, Agent, or Firm—Blakely Sokoloff Taylor & Zafman

(57) ABSTRACT

Disclosed is an algorithm for dynamically changing an RTS threshold, which is a threshold for RTS-CTS frame exchange, depending on the traffic load in the BSS so as to maximize the MAC throughput of an IEEE 802.11 wireless LAN system. The present invention defines a new performance index based on the total time taken to transmit a frame and the time taken to successfully transmit a data frame. The RTS threshold is dynamically increased/decreased in a predefined range depending on the change in the new performance index.

13 Claims, 4 Drawing Sheets

METHOD FOR DYNAMIC CONTROL OF RTS THRESHOLD TO IMPROVE THROUGHPUT OF MAC IN WIRELESS LAN SYSTEM, AND COMPUTER-READABLE MEDIUM THEREOF

CROSS REFERENCE TO RELATED APPLICATION

This application claims priority to and the benefit of Korea Patent Application No. 2003-98202 filed on Dec. 27, 2003 in the Korean Intellectual Property Office, the entire content of which is incorporated herein by reference.

BACKGROUND OF THE INVENTION (a) Field of the Invention

The present invention relates to a method for maximizing medium access control (MAC) throughput by dynamically changing an RTS (Request To Send) threshold providing for a selective use of RTS-CTS (Clear To Send) frame exchange in an IEEE 802.11 wireless LAN system.

(b) Description of the Related Art

Each station STA in the IEEE 802.11 wireless LAN system implements an access point (AP) and a MAC layer. Before frame transmission, the MAC layer acquires access to the network in either a contention mode, i.e., a distribution coordination function (DCF) mode, or a non-contention mode, i.e., a point coordination function (PCF) mode.

The DCF provides an elementary access protocol for automatic sharing wireless media among the stations having compatible physical layers and the AP.

FIGS. 1a and 1b are timing diagrams showing the DCF operation mechanism.

FIG. 1a is a timing diagram of the two-step handshake type DCF operation mode.

While a station STA1 is using a wireless medium for packet transmission in the contention mode, another station STA2 has to wait for the use of the wireless medium.

Here, there is a standard access spacing that delays the access of the station to the shared wireless medium. Short interframe space (SIFS) is an access spacing for the shortest frame interval and the highest priority, and is typically used for ACK, CTS frame, etc. Distributed interframe space (DIFS) is a time interval for transmitting data and control frames in the DCF mode and is longer than the SIFS. Referring to FIG. 1a, the station STA2 tries to gain access to the medium after the access spacing and an elapse of a back-off time, only when it receives an acknowledge signal ACK for data reception from the station STA1.

FIG. 1b shows an RTS/CTS operation mechanism applied in the case where the size of the data frame exceeds a threshold (hereinafter, referred to as "RTS threshold").

The RTS frame is a control frame transmitted to the destination station STA2 by the origination station STA1 for frame transmission. The RTS frame is transmitted exclusively for the data frame greater than the predefined RTS threshold.

The CTS frame is a frame transmitted by the destination station upon receiving the RTS frame, to indicate that the origination station is allowed to transmit the data frame. At this time, a third station STA3 does not try to gain access to the medium so as to avoid any confliction.

According to preceding research analyzing the capacity of the IEEE 802.11 DCF protocol, it is assumed for expedience that all the stations generate a data frame of a predetermined length, so the IEEE 802.11 DCF protocol cannot support a selective RTS-CTS frame exchange depending on the length of the data frame.

On a second assumption that the station in the BSS (Basic Service Set) has a greedy traffic generation profile in a theoretical capacity analysis, it is impossible to provide an accurate solution for determining the MAC throughput for a general traffic type.

According to the IEEE 802.11, the data frame, if equal to or smaller than a specific threshold (i.e., RTS threshold), is transmitted through a physical carrier sense without using RTS and CTS frames. Alternatively, the data frame, if greater than the RTS threshold, is transmitted after the RTS and CTS frames are transmitted.

This is for transmitting the RTS and CTS frames only for the transmission of a relatively large data frame in consideration of the traffic load affecting the wireless media during a retransmission so as to protect from inefficient use of the wireless media caused by successive transmission of the RTS and CTS frames.

Therefore, the use of the RTS/CTS frame must be taken into consideration in the capacity analysis of the wireless LAN system. In addition, the RTS threshold that is a threshold to determine whether to transmit the RTS/CTS frame in transmission of the data frame must be determined in consideration of the capacity of the wireless LAN system so as to maximize the capacity of the wireless LAN system.

As described above, however, the conventional techniques cannot provide a method for changing the RTS threshold to maximize the MAC throughput.

SUMMARY OF THE INVENTION

It is an advantage of the present invention to provide a method for dynamic control of the RTS threshold to maximize the MAC throughput irrespective of the traffic type in the BSS.

In one aspect of the present invention, there is provided a method for dynamically changing an RTS threshold that includes: (a) initializing a performance index represented by a ratio of a total time taken to successfully transmit a data frame to a total time taken to transmit a MAC frame; (b) waiting for a updating period of the RTS threshold, and setting a previous performance index as a first performance index, and a performance index previous to the first performance index as a second performance index; and (c) comparing the size of the first performance index with the size of the second performance index, and adding a difference between first and second preceding RTS thresholds temporally corresponding to the first and second performance indexes, respectively, to a current RTS threshold, so as to update a third RTS threshold.

In another aspect of the present invention, there is provided a performance index estimation method that includes: (a) setting the performance index as a ratio of a total time taken to successfully transmit a data frame to a total time taken to transmit a MAC frame; (b) initializing the performance index; (c) waiting for a service primitive from a physical layer; (d) measuring a time taken to transmit the MAC frame from a transmission time of the service primitive; and (e) updating the performance index based on the result of the step (d) to estimate the performance index.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1A:
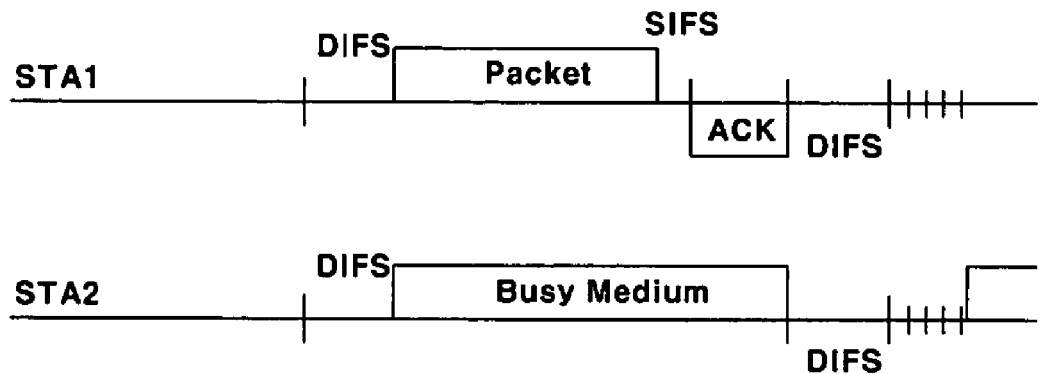
FIGS. 1a and 1b are timing diagrams showing a DCF operation mechanism.
Figure 1B:
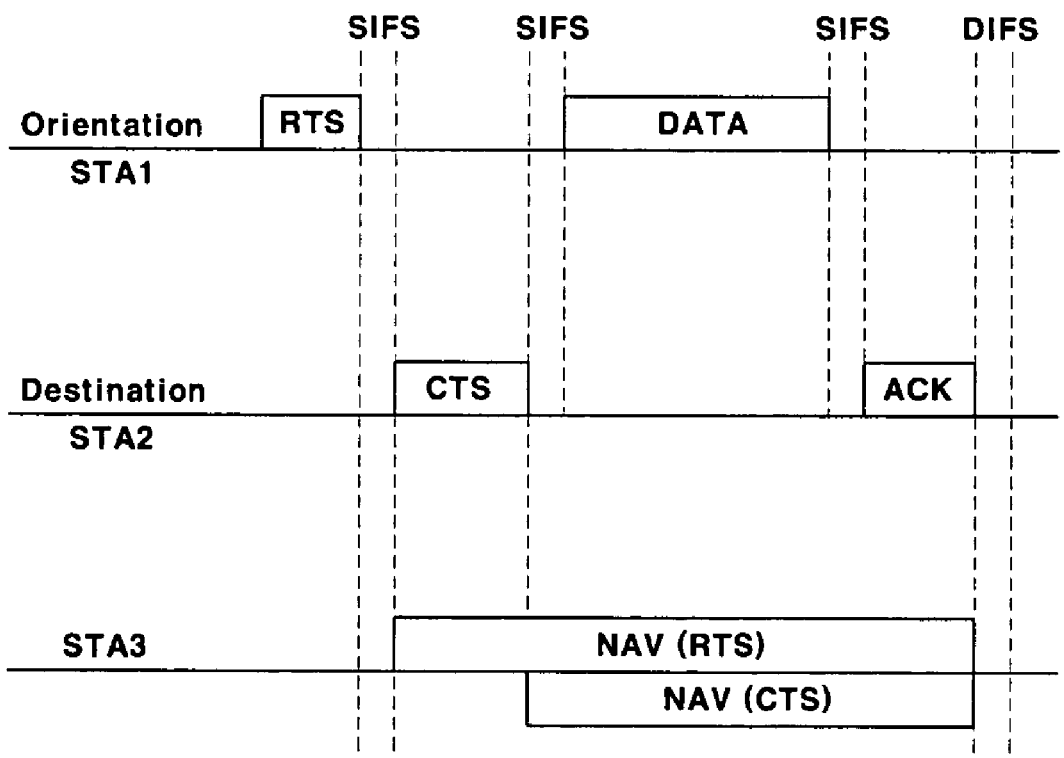

The term "performance index S" as used herein is defined as follows, prior to the following description of the embodiment of the present invention.

The MAC throughput is the ratio of a time taken to successfully transmit a payload in the MAC frame to a time available to transmit the MAC frame on a wireless medium. The factors that affect the MAC throughput include (a) an RTS threshold that is a threshold to determine the use of an RTS-CTS frame based on the size of the payload in the data frame, (b) minimum and maximum values CWmin and Cwmax of CW (Collision Window), (c) DIFS, and (d) SIFS.

The embodiment of the present invention is directed to acquire an algorithm for optimizing an RTS threshold to maximize the MAC throughput without any assumptions for other factors than the RTS threshold.

For such an optimization algorithm, the performance index S is defined by the following Equation 1.

$$S = \text{(the total time S1 taken to successfully transmit a data frame)} / \text{(the total time S2 taken to transmit a MAC frame)} \quad \text{[Equation 1]}$$

The performance index S as defined above is the ratio of the time taken to successfully transmit the data frame to the total time taken to transmit the MAC frame irrespective of whether or not the MAC frame transmission is of a success. Contrarily, the original MAC throughput is defined as the ratio of the time taken to transmit the payload in the data frame to the total time available (including a backoff time not used for actual transmission, DIFS, SIFS, etc.).

The performance index S is not exactly the same as the MAC throughput, but the MAC throughput increases with an increase in the value S. Hence, the MAC throughput can be at maximum with a maximum of the performance index S.

On the other hand, when the AP receives the MAC frame from a station belonging to its BSS, the time T taken to transmit the MAC frame can be calculated from the reception time of the previous PHY-RXSTART.indication signal and the previous PHY-RXEND.indication signal from PLCP (Physical Layer Convergence Protocol) as follows.

Time T taken to transmit MAC frame=reception time of previous PHY-RXEND.indication–reception time of previous PHY-RXSTART.indication The PHY-RXSTART.indication is a service primitive transmitted to the MAC layer by the physical layer so as to indicate that the PLCP has received the PLCP header of the effective start frame. The PHY-RXEND.indication is a service primitive transmitted to the MAC layer by the physical layer to indicate that the reception of the MPDU (MAC Protocol Data Unit) is completed.

There are two cases of reception of the service primitive from the PLCP. A successful CRC (Cyclic Redundancy Check) without an error in PLCP reception is one case, and one with an error is the other. The error in the PLCP reception is detected from the PHY-RXEND.indication and RXERROR received from the PLCP.

In the former case, where the CRC is of a success without an error in PLCP reception and the received MAC frame is a data frame, both the numerator S1 and the denominator S2 of the performance index S are increased.

In the latter case, where (a) the MAC frame successfully received is not a data frame, or (b) there is an error in the PLCP reception or the CRC is of a failure, the data transmission is not successful and only the denominator S2 of the performance index S is increased.

When the AP transmits the MAC frame to the station belonging to its BSS, the time T taken to transmit the MAC frame is calculated from the reception time of the previous PHY-TXSTART.confirm signal and the previous PHY-TXEND.confirm signal from the PLCP as follows.

Time T taken to transmit MAC frame=reception time of previous PHY-XEND.confirm –reception time of previous PHY-TXSTART.confirm The TXEND.confirm is a service primitive transmitted to the MAC layer by the physical layer so as to confirm the completion of a specific MPDU transmission. The PHY-TXSTART.confirm is a service primitive transmitted to the MAC layer by the physical layer so as to start the MPDU transmission.

The previously transmitted MAC frame, if it is a unicast data frame, is not successfully transmitted when the PHY-RXSTART.indication is not received from the PLCP within the ACK timeout interval after the reception of the PHY-TXEND.confirm signal. But, the previous MAC frame is successfully transmitted when the PHY-RXSTART.indication is received from the PLCP within the ACK timeout interval after the reception of the PHY-TXEND.confirm signal.

In case of a successful transmission of the MAC frame, i.e., receiving the PHY-RXSTART.indication within the ACK timeout interval, the calculated time T taken to transmit the MAC frame is added to both the numerator S1 and the denominator S2 of the performance index S.

In case of a failed transmission of the MAC frame, i.e., not receiving the PHY-RXSTART.indication within the ACK timeout interval, the calculated time T taken to transmit the MAC frame is added to only the denominator S2 of the performance index S.

The receiver of the data frame does not report through the ACK frame whether or not the multicast or broadcast data frame is successfully transmitted, so the transmitter of the data frame cannot know the success/failure of the data frame transmission.

Expediently, it is considered in the embodiment of the present invention that the multicast or broadcast data frame is successfully transmitted.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

To clarify the present invention, parts which are not described in the specification are omitted, and parts for which similar descriptions are provided have the same reference numerals.

Hereinafter, the method for changing the RTS threshold according to an embodiment of the present invention is described in detail with reference to the accompanying drawings.

Figure 2:
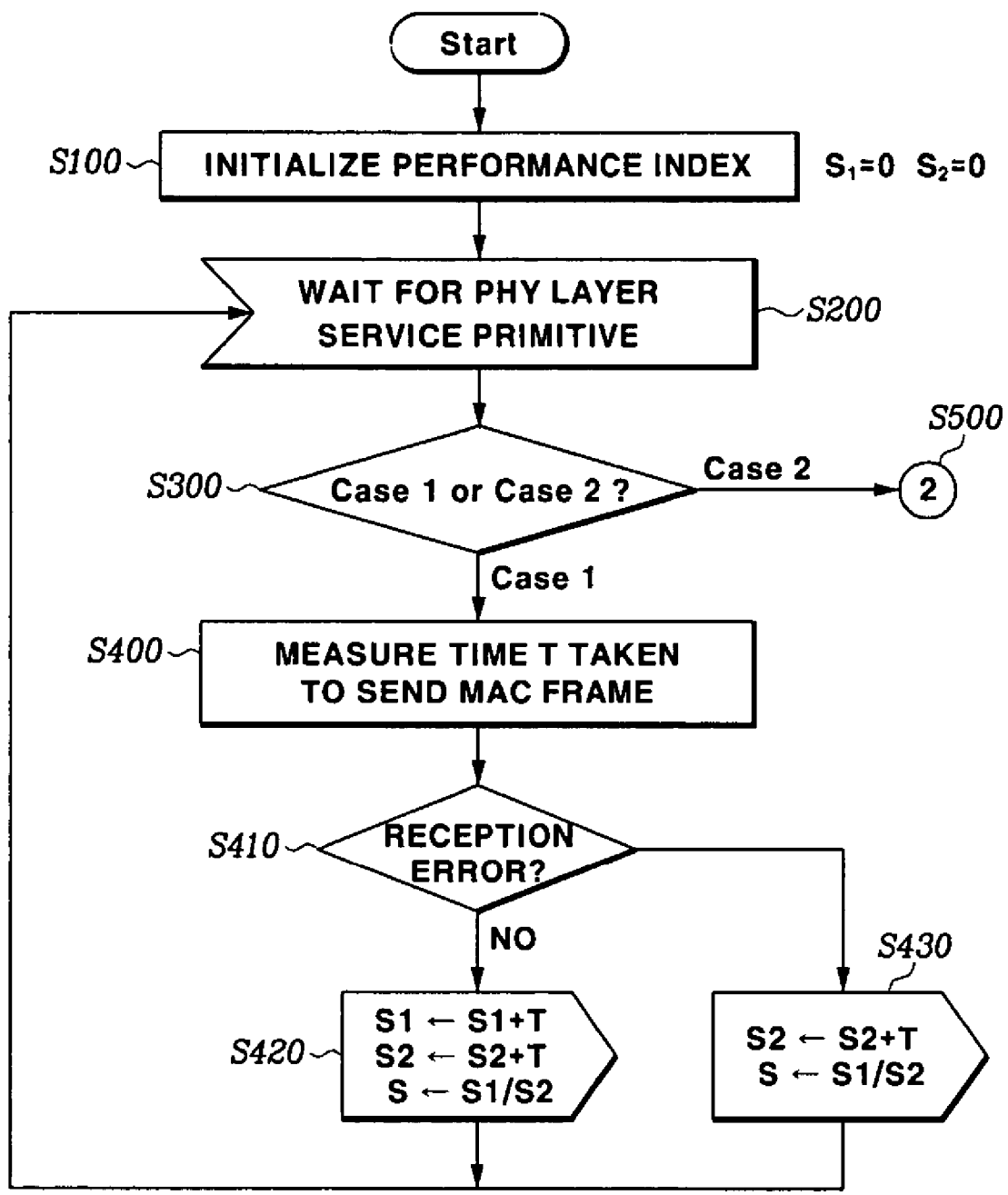
FIGS. 2 and 3 are flow charts showing an algorithm for estimating a performance index S according to an embodiment of the present invention.
Figure 3:
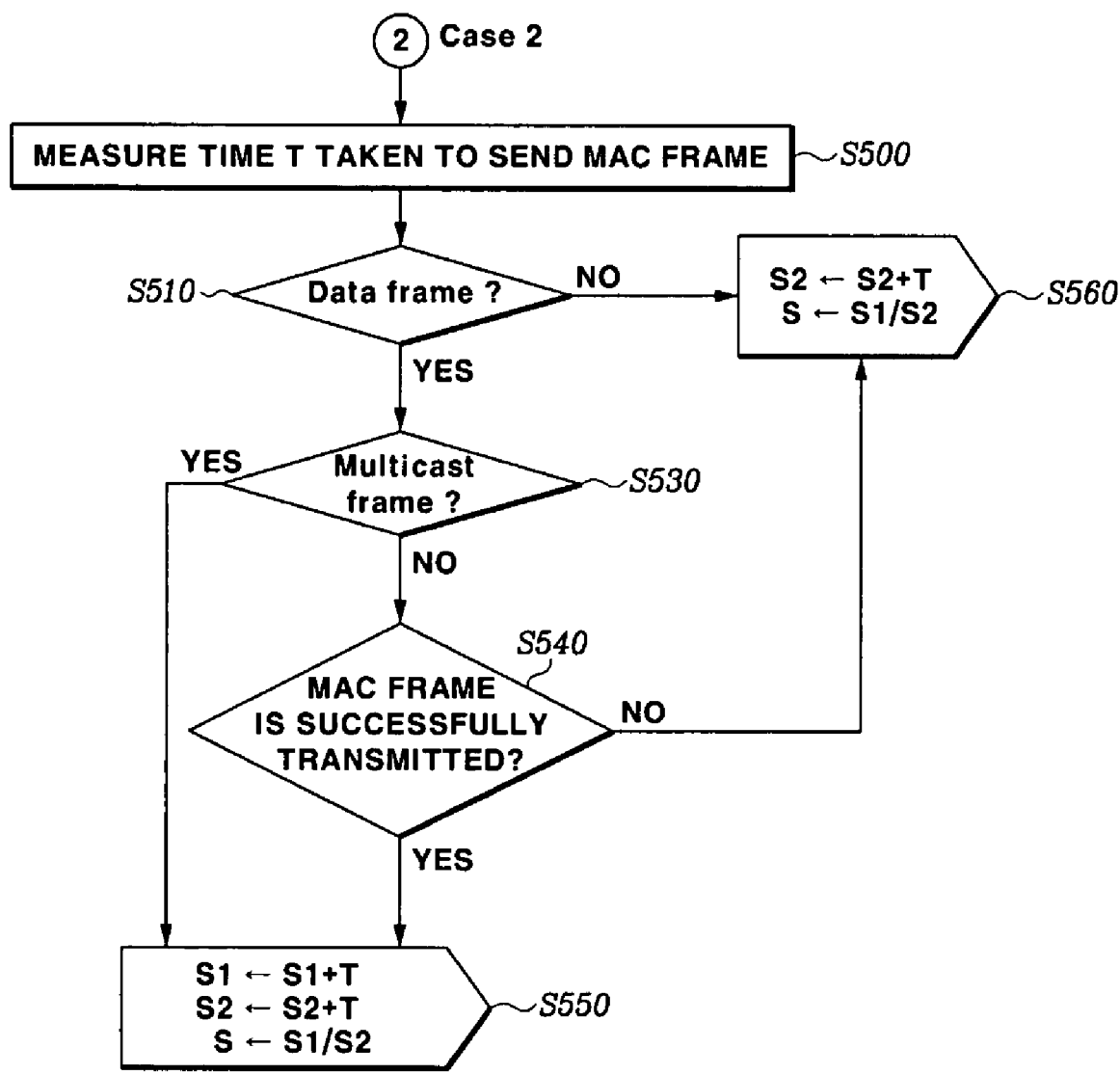

FIGS. 2 and 3 are flow charts showing the estimation algorithm of a performance index S according to an embodiment of the present invention.

First, the flow chart of FIG. 2 is described in sequence.

The initialization of the performance index S is performed in step S100. Here, the time S1 taken to successfully transmit the data frame and the total time S2 taken to transmit the MAC frame are both set to "0".

The algorithm waits for a physical layer service primitive, in step S200. The physical layer service primitive includes PHY-RXEND.indication, PHY-RXSTART.indication, PHY-TXEND.confirm, and PHY-TXSTART.confirm.

There are two cases of the service primitive transmission/reception.

One case is that the PHY-RXSTART.indication (RXVECTOR) signal and the PHY-RXEND.indication (RXERROR) signal are sequentially received from the PLCP layer at a predetermined time interval.

The other is that the PHY-TXSTART.indication signal and the PHY-TXEND.indication signal are sequentially received from the PLCP layer at a predetermined time interval.

Subsequently, the algorithm discriminates between the two cases, in step S300.

The former case is first described in detail, and the latter is described later with reference to FIG. 3.

In the former case, i.e., receiving the PHY-RXSTART.indication (RXVECTOR) signal and the PHY-RXEND.indication (RXERROR) signal in sequence from the PLCP layer at a predetermined time interval, the time T taken to transmit the MAC frame is determined as a time taken from the reception time of the previous PHY-RXEND.indication to the reception time of the previous PHY-RXSTART.indication, in step S400.

In step S410, it is determined whether or not the error value of the received PHY-RXEND.indication (RXERROR) signal is "NoError", to detect a reception error.

If there is no error, or the result of the CRC check is normal, then the reception of the data frame is considered as successful, and the performance index S is updated as follows, in step S420.

$S1\_S1+T$,
$S2\_S2+T$
$S=S1/S2$

If the RXERROR value of the signal has a value other than "NoError", or there is an error detected from the CRC, then the performance index S is updated as follows, in step 430.

$S2\_S2+T$,
$S=S1/S2$

After the completion of the step S420 or S430, the algorithm returns to the step S200 to wait for a service primitive from the physical layer.

FIG. 3 shows the process of the above-stated latter case.

In the latter case, i.e., receiving the PHY-TXSTART.confirm signal and the PHY-TXEND.confirm signal in sequence from the PLCP layer at a predetermined time interval, the time T taken to transmit the MAC frame is measured, in step S500. Here, the time T taken to transmit the MAC frame corresponds to the time taken from the reception time of the previous PHY-TXEND.confirm to the reception time of the previous PHY-TXSTART.confirm.

Once the time T taken to transmit the MAC frame is measured, it is determined in step S510 whether or not the MAC frame is a data frame.

If the MAC frame is not a data frame, then the performance index S is updated as follows, in step S560.

$S2\_S2+T$,
$S=S1/S2$

Otherwise, if the MAC frame is a data frame, it is then determined in step S540 whether or not the data frame is a multicast or broadcast frame.

If the data frame is a multicast or broadcast frame, then the transmission is considered as successful and the performance index S is updated as follows, in step S550.

$S1\_S1+T$,
$S2\_S2+T$,
$S=S1/S2$

Otherwise, if the data frame is not a multicast or broadcast frame, i.e., it is a unicast frame, it is then determined in step S540 whether or not the frame is successfully transmitted. The determination is based on whether or not the PHY-RXSTART.indication signal is received from the PLCP within the ACK timeout interval.

Once the transmission is considered as successful, in step S540, the algorithm goes to step S550 to increase both S1 and S2 by T. With the transmission considered as a failure, in step 540, the algorithm goes to step S560 to increase only S2 by T.

After the completion of the step S540 or S550, the algorithm returns to the step S200 of FIG. 2 to wait for a service primitive from the physical layer.

According to the embodiment of the present invention as illustrated in FIGS. 2 and 3, the performance index S of the present invention can be estimated effectively.

Hereinafter, the method for updating the RTS threshold using the proposed performance index S is described in detail.

In the algorithm of the present invention, the following two values are defined so as to change the RTS threshold.

(1) RTS threshold updating period: U
(2) RTS threshold change unit: V

Basically, the RTS threshold is increased or decreased by V every period U. The change of the performance index S depending to the RTS threshold varying for the period U is monitored to change the RTS threshold.

In the embodiment of the present invention, the change of the RTS threshold depends on the recent change of the two performance index S values.

The performance index S and the RTS threshold over time are defined, and the updating rules are given as follows.

$S(1)$ and $S(2)$ are defined as the latest performance index S and the previous performance index S, respectively. $Thr(1)$ and $Thr(2)$ are defined as the RTS thresholds corresponding to $S(1)$ and $S(2)$, respectively.

Rule 1: If $S(1)>S(2)$, then the RTS threshold is changed as follows.

RTS threshold_RTS threshold+(Thr(1)-Thr(2))

Rule 2: If $S(1)<S(2)$, then the RTS threshold is changed as follows.

RTS threshold_RTS threshold+(Thr(2)-Thr(1))

Rule 3: If $S(1)=S(2)$, then the RTS threshold is increased or decreased by V with a probability of 0.5.

Here, the absolute values of (Thr(1)-Thr(2)) and (Thr(2)-Thr(1)) are V, and the RTS threshold is changed once every period U according to the Rules 1, 2, and 3. The changed value is increased or decreased by V from the previous RTS threshold.

According to the Rules 1 and 2, the RTS threshold is increased or decreased by V with an increase/decrease in the performance index S. When the value of V is small enough, the RTS threshold that maximizes the performance index S according to the Rules 1, 2, and 3 can be calculated.

Even with the value of V not so small enough, the RTS threshold maximizing the performance index S can be acquired within the error range defined by V.

Figure 4:
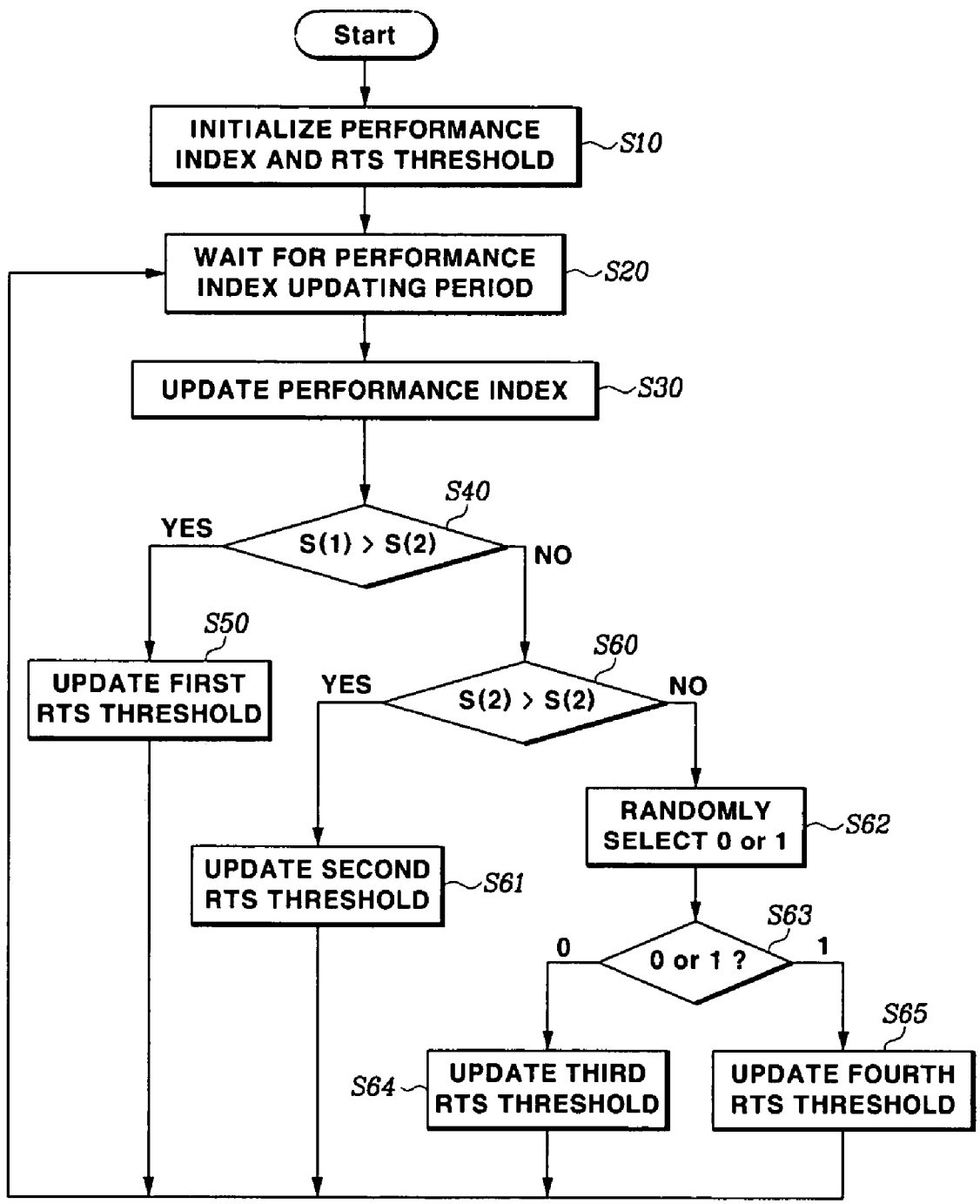
FIG. 4 is a flow chart showing a method for updating an RTS threshold according to an embodiment of the present invention.

FIG. 4 is a flow chart showing a method for updating the RTS threshold according to an embodiment of the present invention.

The minimum and maximum values of the RTS threshold are defined as "a" and "c", respectively.

The performance index and the RTS threshold are initialized in step S10. More specifically, S(1), S(2), Thr(1), and Thr(2) are all set to "0".

The estimation algorithm of performance index S as illustrated in FIGS. 2 and 3 is initialized to wait for the performance index updating period U, in step S20.

After an elapse of the performance index updating period U, in step S30, the performance index S is updated to set S(1) to S(2) and the performance index S to S(1).

In step S40, the value of S(2) is compared with the value of S(1). If the performance index S(1) is greater than the previous performance index S(2), then the algorithm goes to step S50 to perform a first RTS threshold updating step. The updating method of the step S50 is described as follows.

RTS threshold_Max[Min[RTS threshold+(Thr(1)-Thr(2)), c], a]

With the RTS threshold updated, the current RTS threshold is set to Thr(1) and the previous Thr(1) is set to Thr(2).

Once the first RTS threshold updating step ends, the algorithm returns to the step S20. After the step S50, the RTS threshold is increased or decreased by V in a range between its upper and lower limits, so it changes to provide the maximum throughput based on the preceding performance index.

If S(2) is greater than S(1), then a second RTS threshold updating step is performed in step S61. The updating method of the step S61 is described as follows.

RTS threshold_Max[Min[RTS threshold+(Thr(2)-Thr(1)), c], a]

In other words, the current RTS threshold is varied based on the fact that S(2) has a higher performance than S(1). With the RTS threshold updated, the current RTS threshold is set to Thr(1) and the previous Thr(1) is set to Thr(2) in the same manner as described in the step S50.

If S(2) is equal to S(1), then the algorithm generates a random function to select either "0" or "1", in step S62. Depending on the selection result, the algorithm performs third and fourth RTS threshold updating steps, in step S64 and S65, respectively. The updating method of the steps S64 and S65 is described as follows.

RTS threshold_Max[Min[RTS threshold+V, c], a]
RTS threshold_Max[Min[RTS threshold-V, c], a]

After the completion of the steps S50, S61, S64, and S65, the algorithm returns to the step S20 to update the RTS threshold for the optimal throughput, so the RTS threshold can be changed dynamically.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the present invention remarkably changes the RTS threshold dynamically to maximize the MAC throughput, depending on the traffic load in the BSS.

What is claimed is:

1. A method for dynamically changing an RTS (Request To Send) threshold so as to enhance a MAC (Medium Access Control) throughput of a wireless LAN, the method comprising:
   (a) initializing a performance index represented by a ratio of a total time taken to successfully transmit a data frame to a total time taken to transmit a MAC frame;
   (b) waiting for a updating period of the RTS threshold, and setting a previous performance index as a first performance index, and a performance index previous to the first performance index as a second performance index; and
   (c) comparing the size of the first performance index with the size of the second performance index, and adding a difference between first and second preceding RTS thresholds temporally corresponding to the first and second performance indexes, respectively, to a current RTS threshold, so as to update a third RTS threshold.

2. The method as claimed in claim 1, wherein the step (c) includes:
   updating the first RTS threshold, when the first performance index is greater than the second performance index, by adding the first RTS threshold minus the second RTS threshold to the current RTS threshold in a range between upper and lower limits of the RTS threshold; and
   updating the second RTS threshold, when the first performance index is less than the second performance index, by adding the second RTS threshold minus the first RTS threshold to the current RTS threshold in a range between upper and lower limits of the RTS threshold.

3. The method as claimed in claim 2, wherein the step (c) further includes:
   updating the third RTS threshold, when the first performance index is equal to the second performance index, by increasing or decreasing the current RTS threshold by a difference between the first and second RTS thresholds with a same probability.

4. The method as claimed in claim 1, wherein after the completion of the step (c), the method returns to the step (b) to continue updating.

5. The method as claimed in claim 1, wherein the performance index S is defined by:

$S$=(total time $S1$ taken to successfully transmit data frame)/(total time $S2$ taken to transmit MAC frame)

the performance index being updated by adding a time T taken to transmit the MAC frame to both the S1 and the S2 in a case where the data frame is successfully transmitted, and adding the time T to the S2 in other cases.

6. A performance index estimation method, which is for estimating a performance index used as a basis of changing an RTS threshold so as to enhance a MAC throughput of a wireless LAN system by dynamically changing the RTS threshold, the performance index estimation method comprising:
   (a) setting the performance index as a ratio of a total time taken to successfully transmit a data frame to a total time taken to transmit a MAC frame;
   (b) initializing the performance index;

(c) waiting for a service primitive from a physical layer;

(d) measuring a time taken to transmit the MAC frame from a transmission time of the service primitive;

(e) updating the performance index based on the result of the step (d) to estimate the performance index.

7. The performance index estimation method as claimed in claim 6, wherein the service primitive from the physical layer includes a PHY-RXEND.indication signal, and a PHY-RXSTART.indication signal.

8. The performance index estimation method as claimed in claim 7, wherein the step (d) includes defining the time taken to transmit the MAC frame as a time taken from a reception time of the PHY-RXEND.indication signal to a reception time of the PHY-RXSTART.indication signal, the step (e) including adding the time taken to transmit the MAC frame to both the total time taken to transmit the MAC frame and the total time taken to successfully transmit the data frame.

9. The performance index estimation method as claimed in claim 8, further comprising:

detecting a reception error, the step (e) including adding the time taken to transmit the MAC frame only to the total time taken to transmit the MAC frame, upon detection of a reception error.

10. The performance index estimation method as claimed in claim 6, wherein the service primitive from the physical layer includes a PHY-TXSTART.confirm signal, and a PHY-TXEND.confirm signal.

11. The performance index estimation method as claimed in claim 10, wherein the step (d) includes defining the time taken to transmit the MAC frame as a time taken from a reception time of the PHY-TXEND.confirm signal to a reception time of the PHY-TXSTART.confirm signal, the step (e) including adding the time taken to transmit the MAC frame to both the total time taken to transmit the MAC frame and the total time taken to successfully transmit the data frame.

12. The performance index estimation method as claimed in claim 11, wherein the step (e) further includes determining whether or not the MAC frame is a data frame, the time taken to transmit the MAC frame being added to the total time taken to transmit the MAC frame, when the MAC frame is not a data frame.

13. The performance index estimation method as claimed in claim 12, wherein the step (e) further includes determining whether or not the data frame is a unicast frame, the time taken to transmit the MAC frame being added to both the total time taken to transmit the MAC frame and the total time taken to successfully transmit the data frame, when the data frame is a unicast frame and a frame transmission success signal is received.

* * * * *